(12) United States Patent
Miller et al.

(10) Patent No.: US 7,765,205 B2
(45) Date of Patent: Jul. 27, 2010

(54) LANDMARK CASE IDENTIFICATION SYSTEM AND METHOD

(75) Inventors: David James Miller, Dayton, OH (US); Harry R. Silver, Shaker Heights, OH (US); Andrew L. Freisthler, Lebanon, OH (US)

(73) Assignee: LexisNexis, Miamisburg, OH (US)

( * ) Notice: Subject to any disclaimer, the term of this patent is extended or adjusted under 35 U.S.C. 154(b) by 434 days.

(21) Appl. No.: 11/204,994

(22) Filed: Aug. 17, 2005

(65) Prior Publication Data

US 2006/0041608 A1 Feb. 23, 2006

Related U.S. Application Data

(60) Provisional application No. 60/603,278, filed on Aug. 23, 2004.

(51) Int. Cl.
*G06F 17/20* (2006.01)
*G06F 15/16* (2006.01)

(52) U.S. Cl. .................. 707/722; 707/723; 707/912; 707/942

(58) Field of Classification Search .................. None
See application file for complete search history.

(56) References Cited

U.S. PATENT DOCUMENTS 5,692,176 A 11/1997 Holt et al.
5,819,260 A 10/1998 Lu et al.
5,920,854 A * 7/1999 Kirsch et al. .................. 707/3
6,571,241 B1 * 5/2003 Nosohara ...................... 707/6
6,728,725 B2 * 4/2004 Garfield et al. ............. 707/102
2001/0051943 A1 * 12/2001 Drucker et al. ................ 707/3
2002/0023085 A1 2/2002 Keith, Jr.
2002/0169762 A1 * 11/2002 Cardona ....................... 707/3

FOREIGN PATENT DOCUMENTS

WO WO 01/35274 A 5/2001

* cited by examiner

*Primary Examiner*—John E Breene
*Assistant Examiner*—Alex Gofman
(74) *Attorney, Agent, or Firm*—Dinsmore & Shohl LLP

(57) ABSTRACT

A landmark case identification system and method in which the user is presented with a set of the most relevant documents on a selected topic. This set, which is dynamic and asserted to be inclusive at any point in time, is presented to the user in a Virtual Digest and initially sorted by court/date order. The user has an option to resort the answer set using a Frequently Cited sort option, which causes the system to dynamically analyze the answer set for references between the documents. Landmark cases are identified by their peers in the domain as they will be referenced and relied upon most often. The user is presented with the resorted answer set, and information detailing how many other cases in the domain referenced them is now included.

20 Claims, 16 Drawing Sheets

52c → Confirm Sort

Sorting by "Frequently Cited" requires identifying how many times each case is cited by other cases in your search results. This may take a few minutes.

Do you want to continue?

[Continue] [Cancel]

FIG. 7

60 → Unable to Sort

Your results cannot be sorted using "Frequently Cited." There are too many cases to sort by how often each case is cited by the others.

LANDMARK CASE IDENTIFICATION SYSTEM AND METHOD

CROSS-REFERENCE TO RELATED APPLICATIONS

The present patent application is based on, and claims priority from, U.S. provisional Application No. 60/603,278, filed Aug. 23, 2004, which is incorporated herein by reference in its entirety.

COPYRIGHTED MATERIAL

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a landmark case identification system and method using interactive legal databases, particularly interactive online legal databases. More specifically, the invention relates to a landmark case identification system and method that pinpoints how many and how often documents in a set of documents relevant to a particular topic reference other documents in the same set.

2. Related Art

Interactive legal databases, and particularly interactive online legal databases, commonly provide a "popularity ranking" for search results. However, a legal database search is not capable of identifying landmark cases in an answer set.

It is to the solution of these and other problems that the present invention is directed.

SUMMARY OF THE INVENTION

It is accordingly a primary object of the present invention to provide a legal database sort feature that can identify landmark cases in a set of documents relevant to a particular topic.

This and other objectives of the present invention are achieved by a landmark case identification system and method in which the user is presented with a set of the most relevant documents on a selected topic. This set, which is dynamic and asserted to be inclusive at any point in time, is presented to the user in a Virtual Digest and initially sorted by court/date order. The user has an option to resort the answer set using a Frequently Cited sort option, which causes the system to dynamically analyze the answer set for references between the documents. Landmark cases are identified by their peers in the domain as they will be referenced and relied upon most often. The user is presented with the resorted answer set, and information detailing how many other cases in the domain referenced them is now included.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 7 illustrates an exemplary screen display of a "Confirm Sort" message following request of a "Frequently Cited" sort of the results of a "Retrieve All" search.

FIG. 8 illustrates an exemplary screen display of an "Unable to Sort" message following request of a "Frequently Cited" sort of the results of a "Retrieve All" search.

FIG. 9A illustrates the top portion of an exemplary screen display of the results of a "Retrieve All" search, sorted by court/date order.

FIG. 10A illustrates the top portion of an exemplary screen display of a "Frequently Cited" sort of the results of a "Retrieve All" search.

DETAILED DESCRIPTION OF THE PREFERRED EMBODIMENTS

Figure 1A:
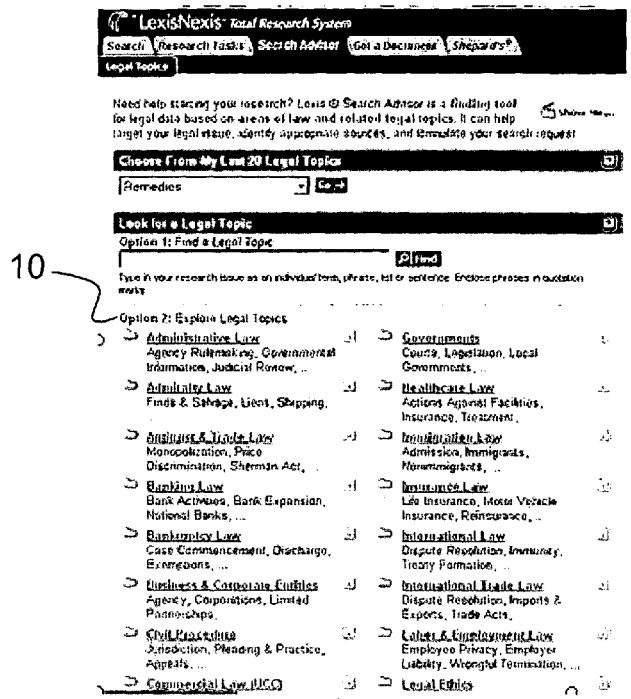
FIGS. 1A-1D are exemplary screen displays illustrating drilling down through a hierarchical grouping of topics using the Lexis™ Research System Search Advisor product hierarchy.
Figure 1B:
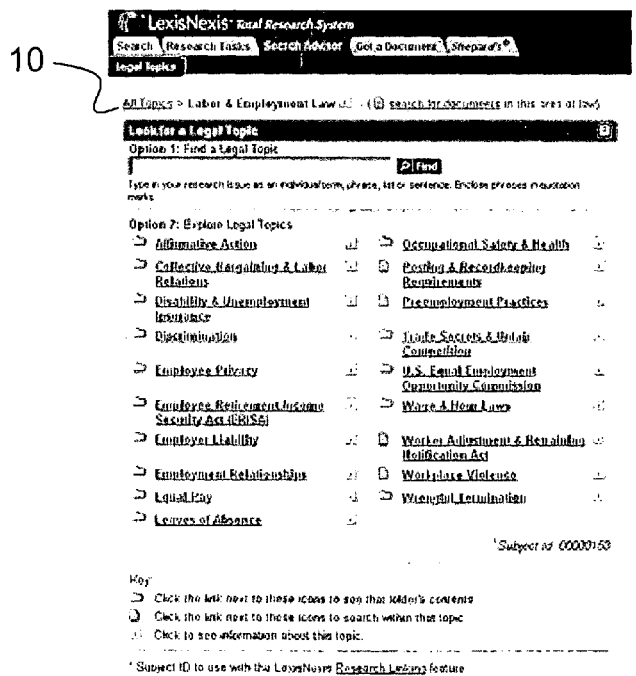
Figure 1C:
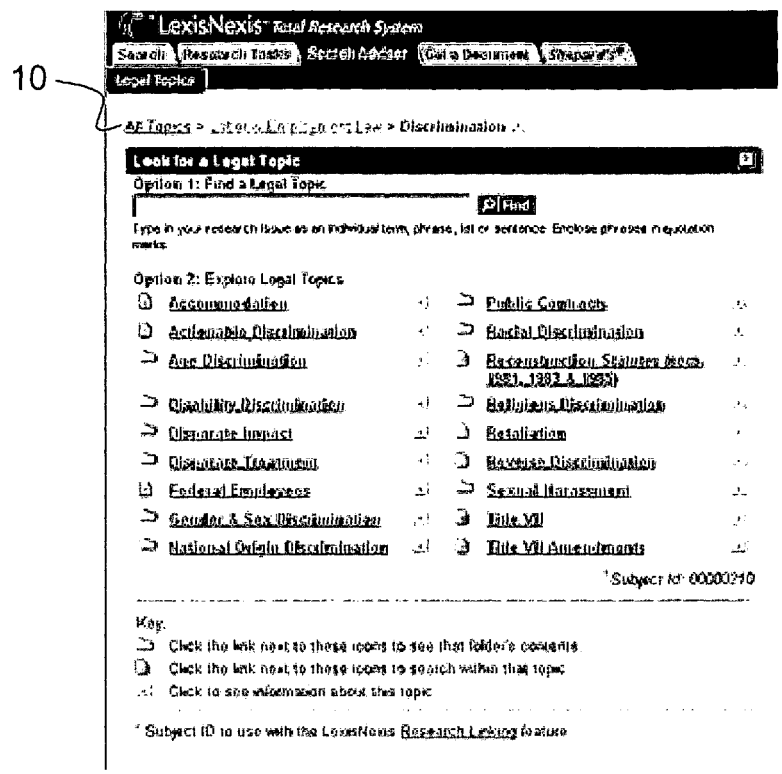
Figure 1D:
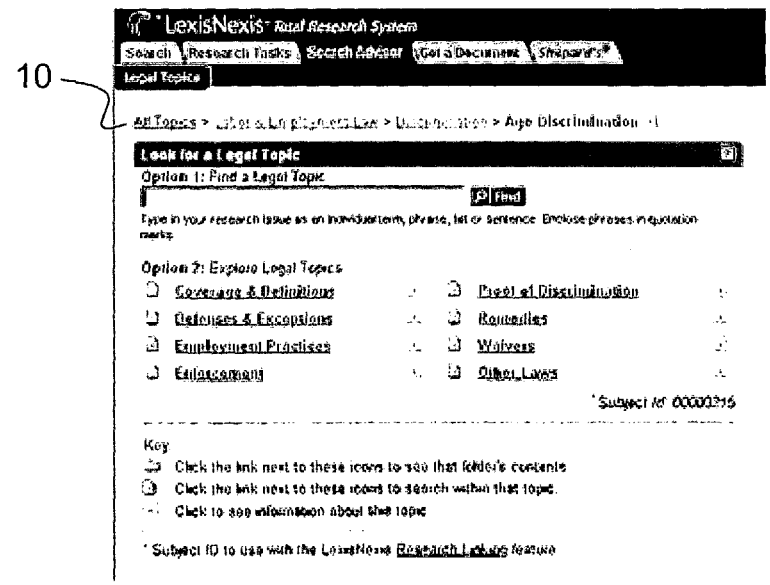

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the functions described.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions described.

The following definitions are used herein:

Headnote: A point of law identified by an editor in the body of a caselaw document; the points of law are reproduced at the top of the case so that researchers can easily determine what the case is about.

Virtual Digest or Digest View: A view that displays matching headnotes and the best paragraph display format in a single answer set. The Virtual Digest may be sorted by user-selected options.

Best Paragraph or Best Text: A format in which a portion of the text case is displayed. The terms displayed preferably are from one of the most relevant discussions in the case, and the entire chunk of text will be about the size of a paragraph. Additional information about the case, such as the name and citation, is also included.

Retrieve All (RA): A search feature that allows users to retrieve cases relevant to a selected legal topic, such as a Lexis™ Research System Search Advisor topic, whether or not the cases contain a headnote with a topic label. Users are able to isolate only the cases with a headnote on a topic from the initial Retrieve All answer set.

Retrieve All Boolean Algorithm: a more narrowly defined Boolean search using the Topic's Boolean Algorithm and restricting it to the CORE-TERMS of the documents within the defined jurisdiction. The Core Terms are determined algorithmically and represent the statistically most important words and phrases within the document using the phrase identification process described in U.S. Pat. No. 5,819,260, which is incorporated herein by reference.

Search Advisor (SA): A search feature that allows users to access cases from a subject within a topical hierarchy for a selected jurisdiction.

Topic's Boolean Algorithm: The Boolean search that is written to identify cases that should be included in a Search Advisor topic's collection of cases. A Boolean search is written for every Search Advisor end node.

The landmark case identification system and method in accordance with the present invention identifies landmark cases by dynamically analyzing how many and how often documents in an answer set reference other documents in the answer set. The answer set is a set of documents that are presumed to encompass all material on a given topic within a specified jurisdiction and optionally, within a specified date range. Preferably, the answer set is displayed as a "Virtual Digest." The Lexis™ Research System Search Advisor hierarchy, or any other search system that displays results as a Virtual Digest can be used to define the answer set.

While the landmark case identification system in accordance with the present invention is not limited to any specific database search, for exemplary purposes, in the implementation described herein, the present invention is presented as a service available through the Lexis™ Research System interactive, online, legal databases, and more particularly, using the Lexis™ Research System Search Advisor product. However, it will be appreciated by those of skill in the art that the present invention can be implemented in association with services other than the Lexis™ Research System and using search features other than the Lexis™ Research System Search Advisor product.

The Search Advisor product classifies Lexis™ Research System caselaw material into groups of various points of law, or topics. Topics are defined by both a set of editorially maintained searches as well as classifications assigned to headnotes, or points of law, within the material.

Figure 14:
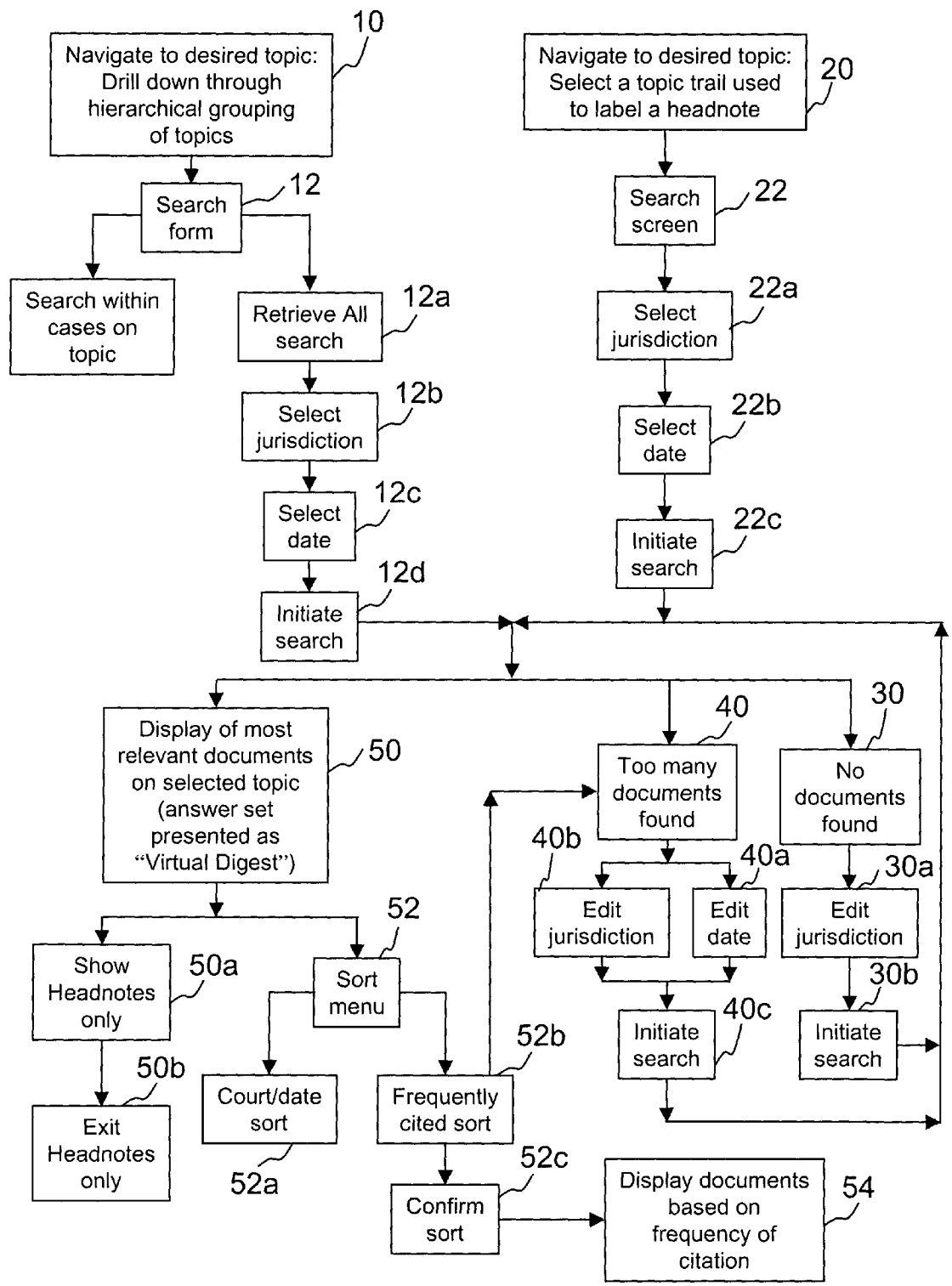
FIG. 14 is a tree diagram illustrating the features of the landmark case identification system and method in accordance with the present invention.

With reference to the exemplary screen displays illustrated in FIGS. 1A-1D, 2-8, 9A-9B, and 10A-10C, and to FIG. 14, which illustrates the exemplary screen display in tree diagram format, a user navigates to his or her desired topic by either: (1) drilling down through a hierarchical grouping of these topics 10, at which point the user is presented with a search form 12, which includes a Retrieve All feature 12a, or (2) selecting a topic trail 20b used to label a LexisNexis headnote 20, which invokes a Retrieve All screen 22. After selecting the Retrieve All feature 12 or 22, the user is presented with a set of the most relevant documents on that topic 50, referred to as the answer set, or domain. This set, or domain, is established using the editorially maintained searches and the LexisNexis Boolean search engine to perform the Retrieve All Boolean Algorithm. Using this approach, the domain is dynamic and asserted to be inclusive at any point in time. The answer set is presented in a Virtual Digest 50 and initially sorted by court/date order 52a.

Once in the Virtual Digest 50 for a Retrieve All search, the user has an option to resort the answer set using a sort menu 52 located on the user interface. Selecting the Frequently Cited sort option 52b will cause the system to dynamically analyze the answer set for references between the documents. This is both dynamic, because the domains established by the Retrieve All searches change over time and by jurisdiction, and distributed, as the data is stored across many servers. Landmark cases are identified by their peers in the domain, as they will be referenced and relied upon most often. The user is presented with the resorted answer set 54 (FIGS. 10A-10C), and information detailing how many other cases in the domain referenced them is now included.

Figure 2:
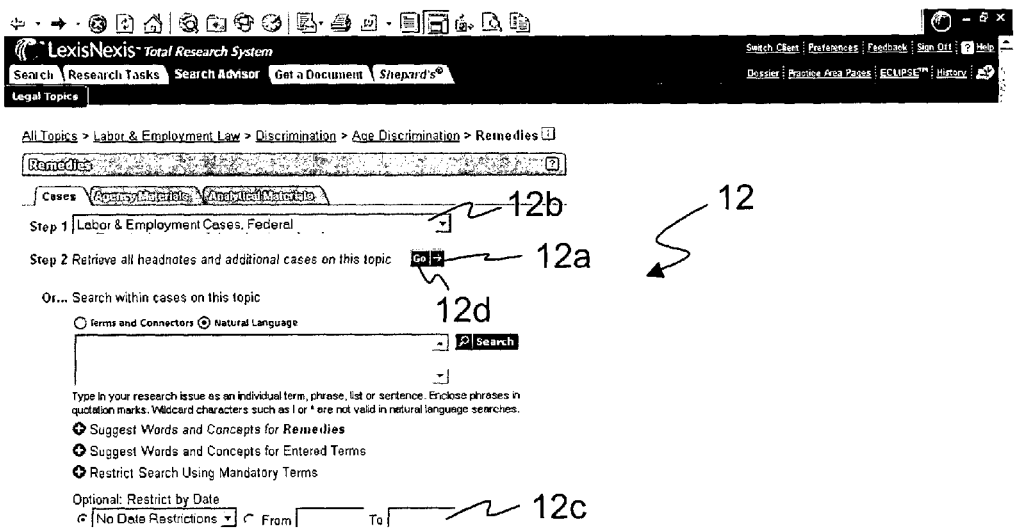
FIG. 2 illustrates an exemplary screen display presented to a user on reaching the end node of the hierarchy of FIG. 1D.
Figure 3:
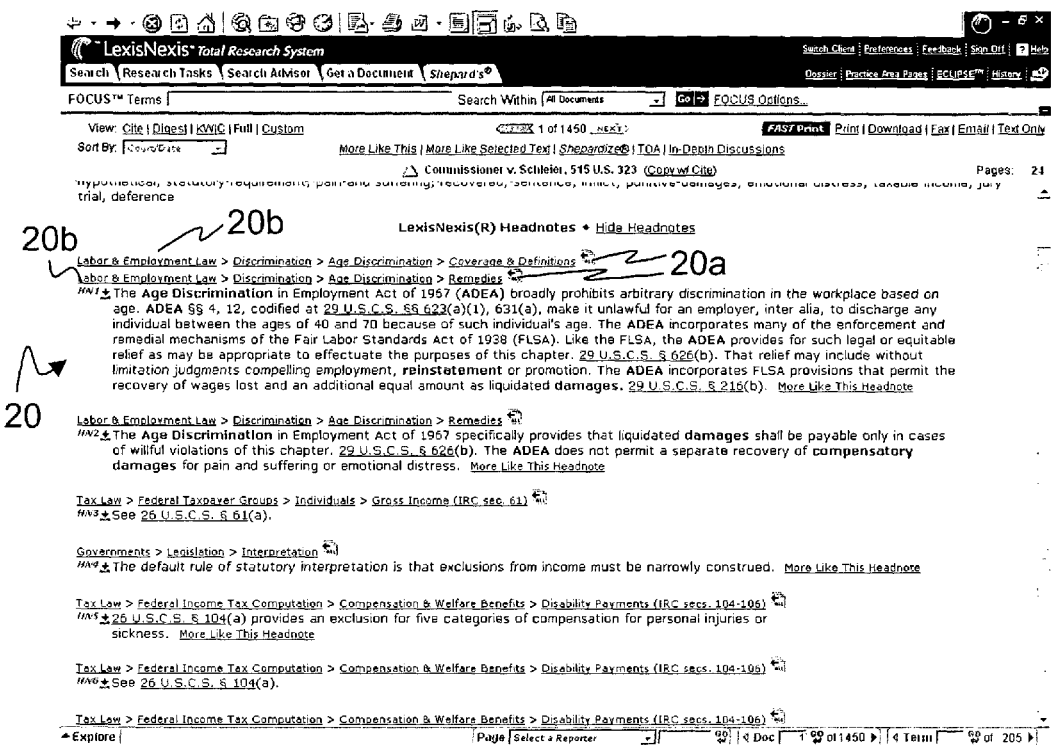
FIG. 3 is an exemplary screen display of the headnotes portion of a FULL case display.

For purposes of illustration, and without limiting the invention thereto, an example is described herein for research relating to Labor and Employment law, and more particularly, to remedies for age discrimination. In the Lexis™ Research System Search Advisor product, the user selects the topic Labor & Employment Law>Discrimination>Age Discrimination>Remedies by drilling down in the Search Advisor topical hierarchy (FIGS. 1A-1D) (corresponding to block 10 in FIG. 14). Upon arriving at a topical end node, the user encounters a search form screen 12 (FIG. 2), where the Retrieve-All option 12a is available among other choices. Before carrying out a Retrieve All search, the user must select a jurisdiction 12b, for example by selecting a "Select Jurisdiction" drop-down button to display a list of jurisdictions; and also has the option of selecting a date restriction 12c (FIG. 2). Once the user has selected a jurisdiction and, optionally, a date restriction, the user clicks on a "Go" icon 12d to initiate the Retrieve All search.

Figure 4:
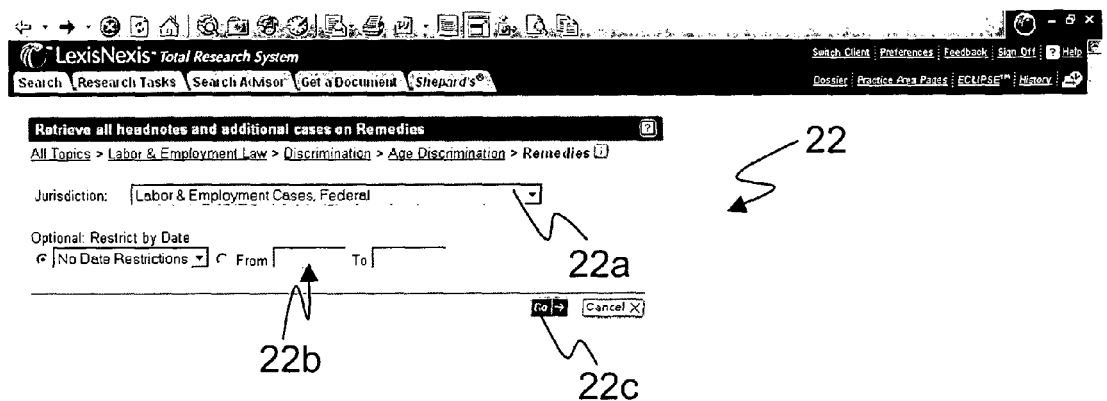
FIG. 4 illustrates an exemplary screen display presented to a user on clicking on a Retrieve All icon at the end of a topic trail for one of the headnotes of FIG. 3.

Alternatively, a user can invoke the Retrieve-All feature from an icon 20a appearing in the display of an actual case that the user is reviewing (FIG. 3) (corresponding to block 20 in FIG. 14). Specifically, the icon 20a is found at the end of the topic trail 20b for any end-node topic used to label a Lexis-Nexis headnote. When the user clicks on the Retrieve All icon 20a, he or she is presented with a Retrieve All search screen 22, and must then select a jurisdiction 22a and may optionally select a date range 22b (FIG. 4). Once the user has selected a jurisdiction and, optionally, a date restriction, the user clicks on a "Go" icon 22c to initiate the Retrieve All search.

Figures 5, 6:
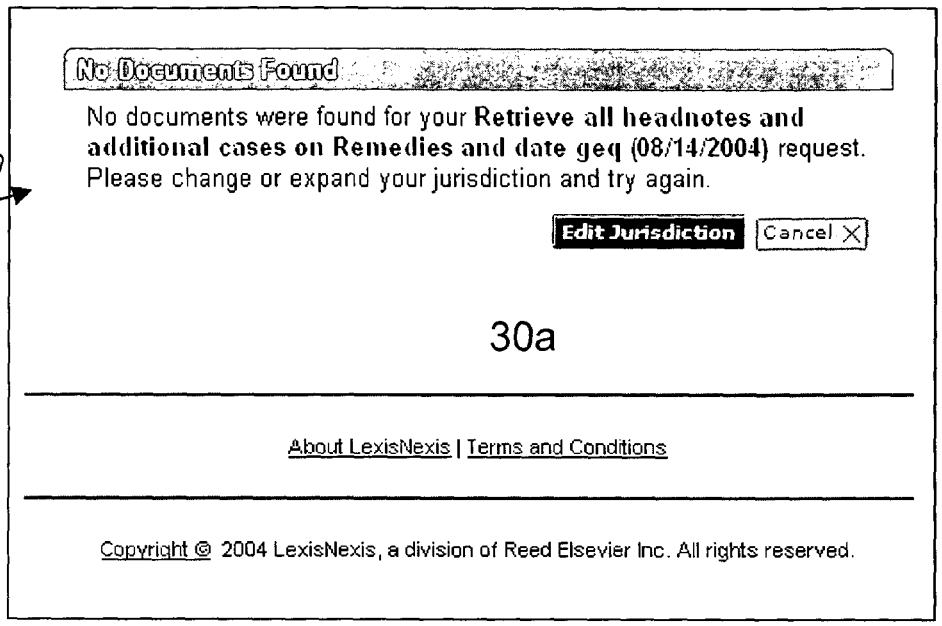
FIG. 5 illustrates an exemplary screen display of a "No Documents Found" message following running of a "Retrieve All" search.
FIG. 6 illustrates an exemplary screen display of a "More than 3000 Results" message following request of a "Retrieve All" search.

If no documents are found, a message 30 is displayed advising the user to change or expand the jurisdiction 30a (FIG. 5) and try again 30b (FIG. 14). If more than 3,000 documents are found, a message 40 is displayed advising the user that the search has been interrupted and that the user should try a more restricted jurisdiction 40a (FIG. 6) or a more specific date 40b (FIGS. 6 and 14) and try again 40c (FIG. 14). It is noted that the search parameters used to generate the messages shown in FIGS. 5 and 6 are different from the search parameters shown in the preceding figures, as the search parameters in the preceding figures do not generate the error messages shown in FIGS. 5 and 6.

Figure 9A:
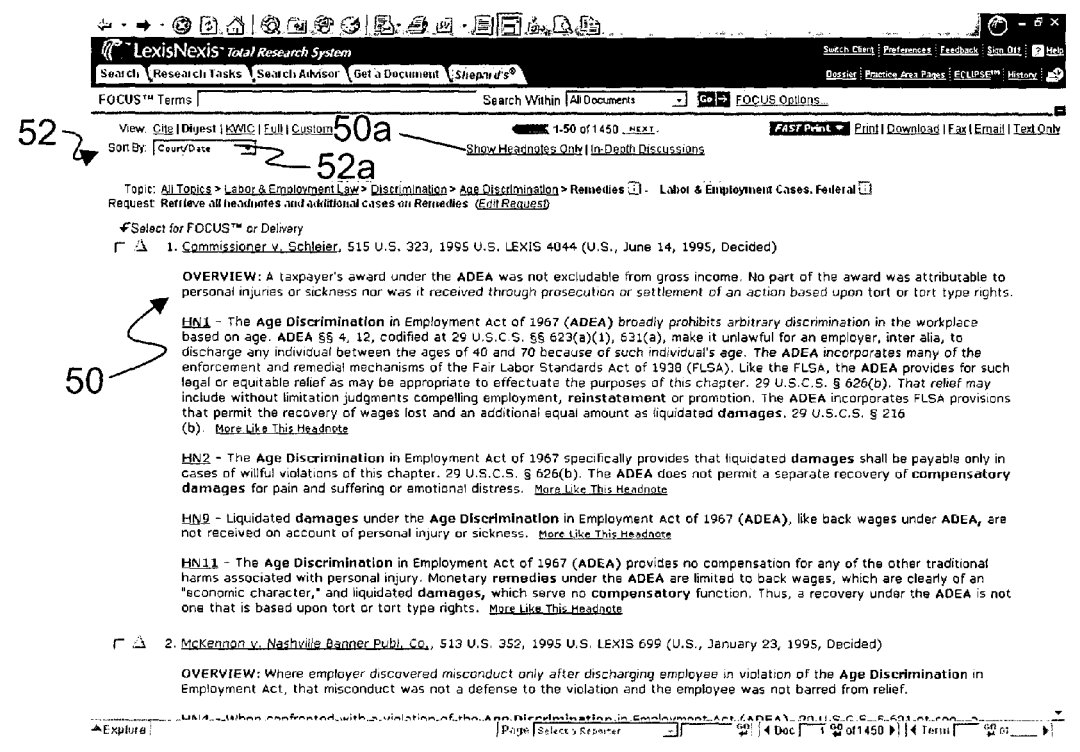
Figure 9B:
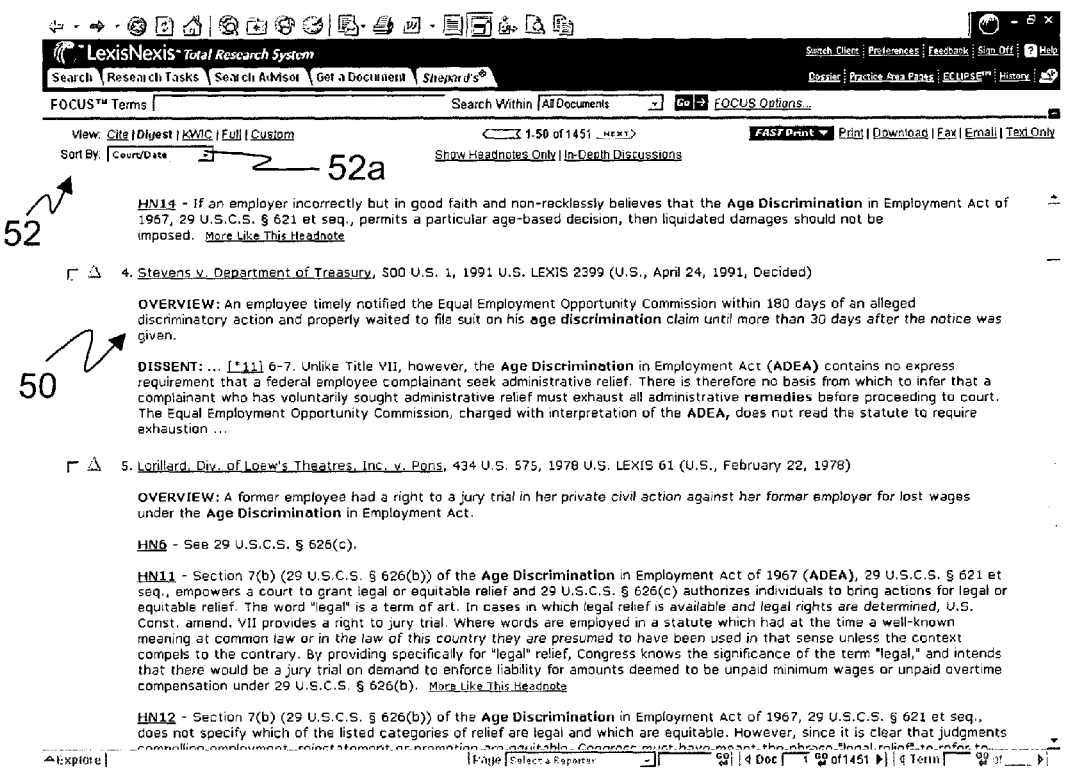
FIG. 9B illustrates the middle portion of an exemplary screen display of the results of a "Retrieve All" search, sorted by court/date order.

Results appear in Digest View 50, which includes headnotes for the selected topic (FIGS. 9A and 9B). The Digest View 50 also shows the most pertinent text from other highly relevant cases, such as "Stevens v. Department of Treasury" (FIG. 9B). These additional cases are included because they are relevant to the topic, although they may not have a headnote assigned to the topic.

Figure 10A:
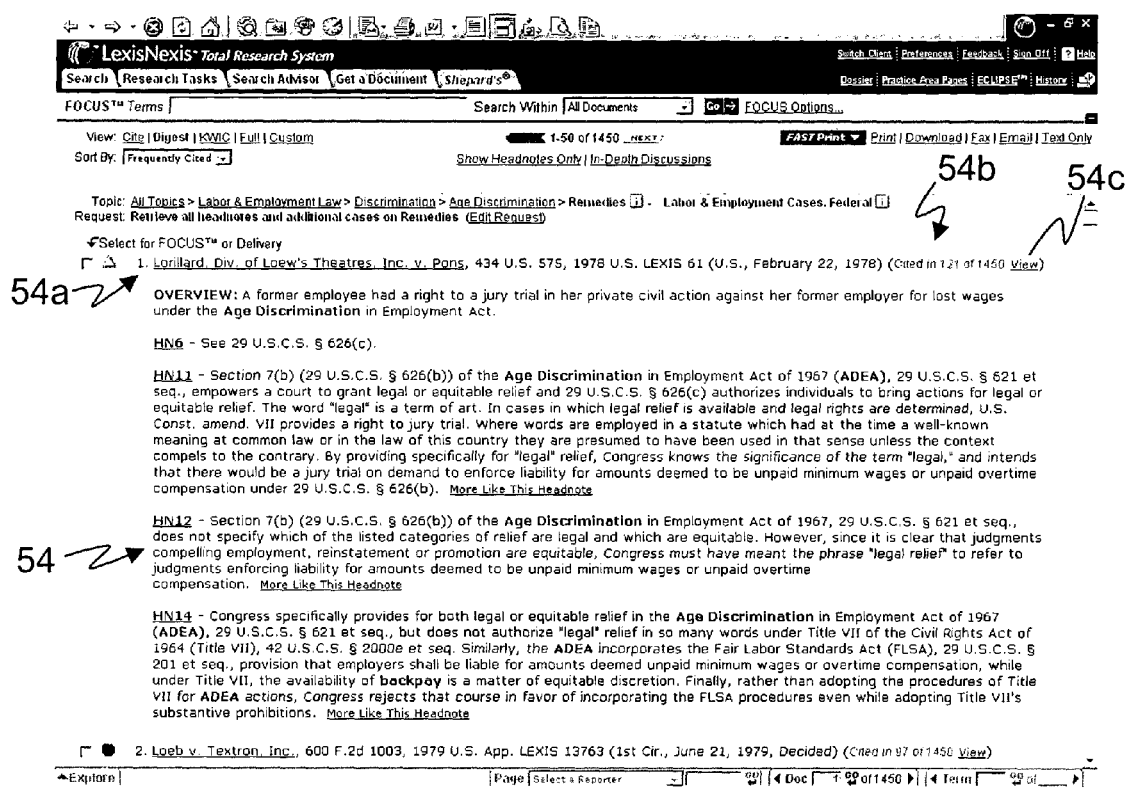
Figure 10B:
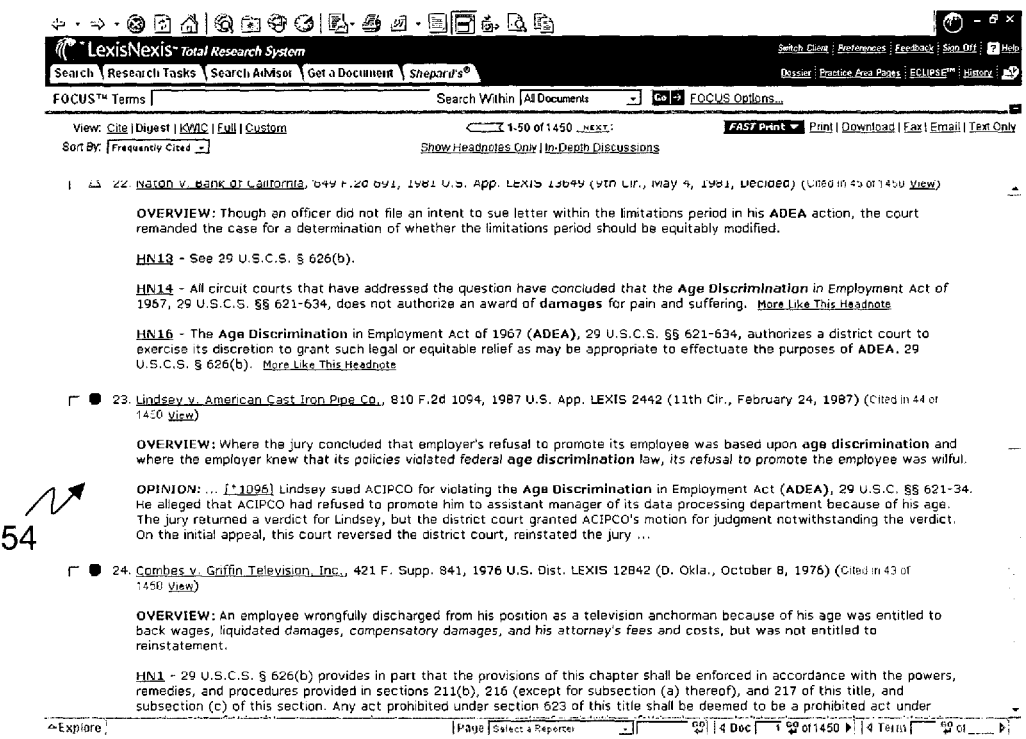
FIG. 10B illustrates the middle portion of an exemplary screen display of a "Frequently Cited" sort of the results of a "Retrieve All" search.
Figure 10C:
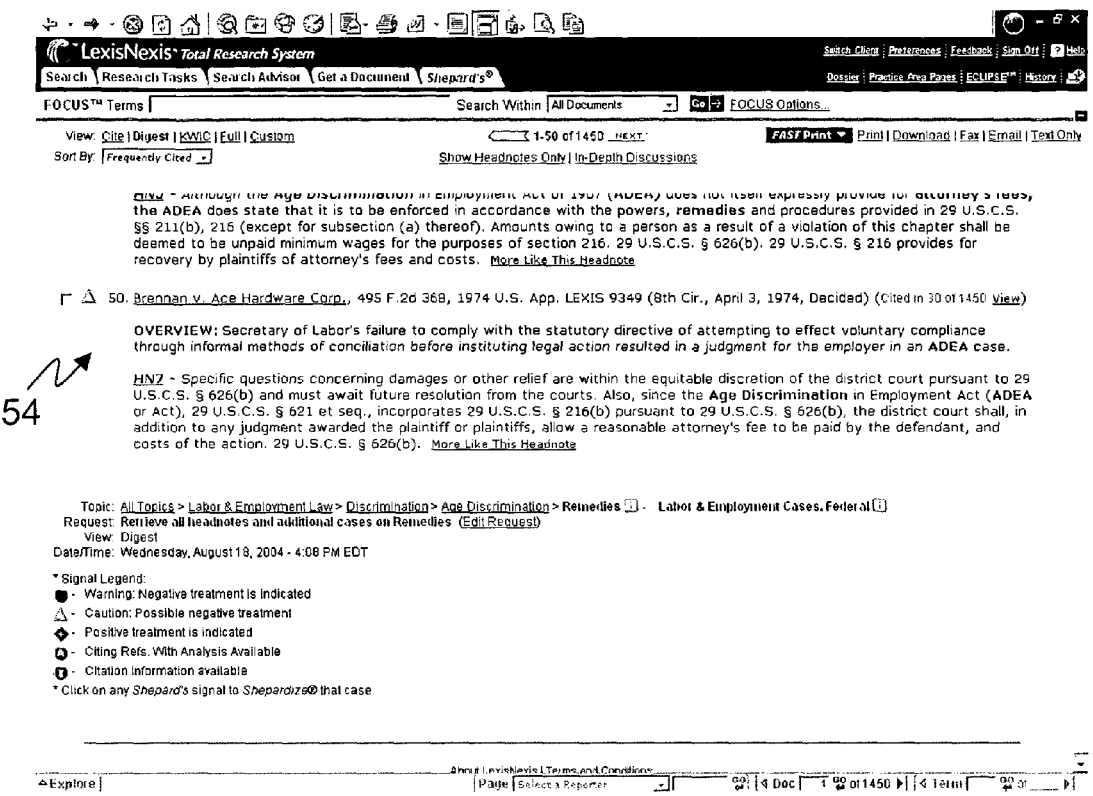
FIG. 10C illustrates the bottom portion of an exemplary screen display of a "Frequently Cited" sort of the results of a "Retrieve All" search.

The user can display only the cases with headnotes by selecting the "Show Headnotes Only" link 50a. To redisplay all cases for the topic, the user can select the "Exit Headnotes Only" link (not shown). Normally, cases are displayed in order by Court/Date 52a (FIGS. 9A-9B). However, the user can use the landmark case identification system and method in accordance with the present invention to sort the cases and display them based on how frequently they are cited in other cases on the list 52b (FIG. 14). To sort based on frequency of citation, the user clicks on the "Sort by" drop-down 52, then selects "Frequently Cited." A confirmation message 52c is displayed (FIG. 7), advising the user that the search may take a few minutes, and requesting confirmation that the user wishes to continue. If there are too many cases to sort based on frequency of citation, a message 60 is displayed advising the user to this effect (FIG. 8). Otherwise, the documents display 54 with the most frequently cited cases first (FIGS. 10A-10C).

When the user selects a sort based on frequency of citation 52b, the cases 54a are ranked by how often they are cited by the other cases in the answer set. Each case 54a displays the number of cases 54b in which it is cited, and has a "view" link 54c. To display those cases that cite a particular case, the user can select its "view" link.

Figure 11:
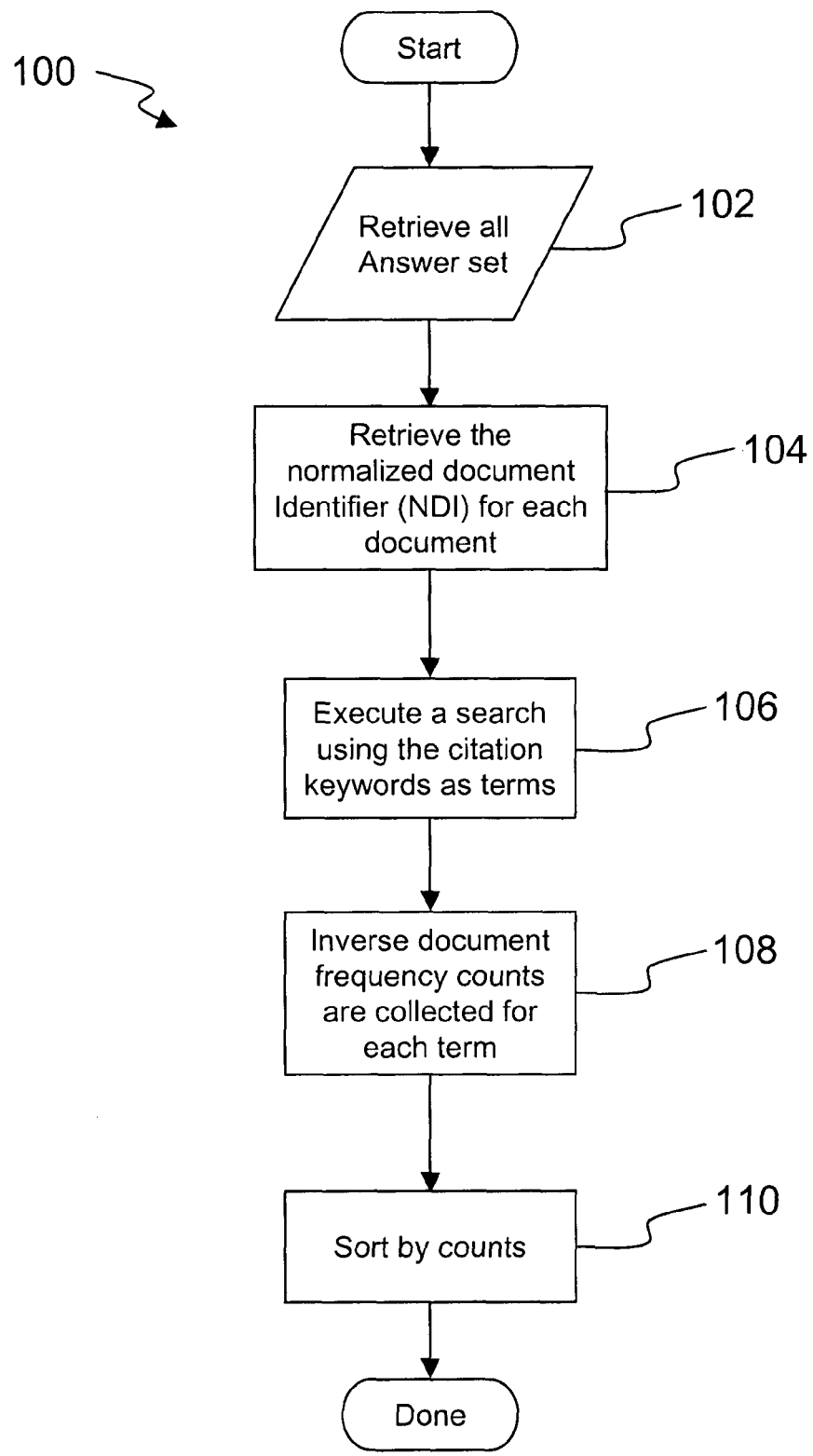
FIG. 11 is a high level flow diagram of the Frequently Cited process.
Figure 12:
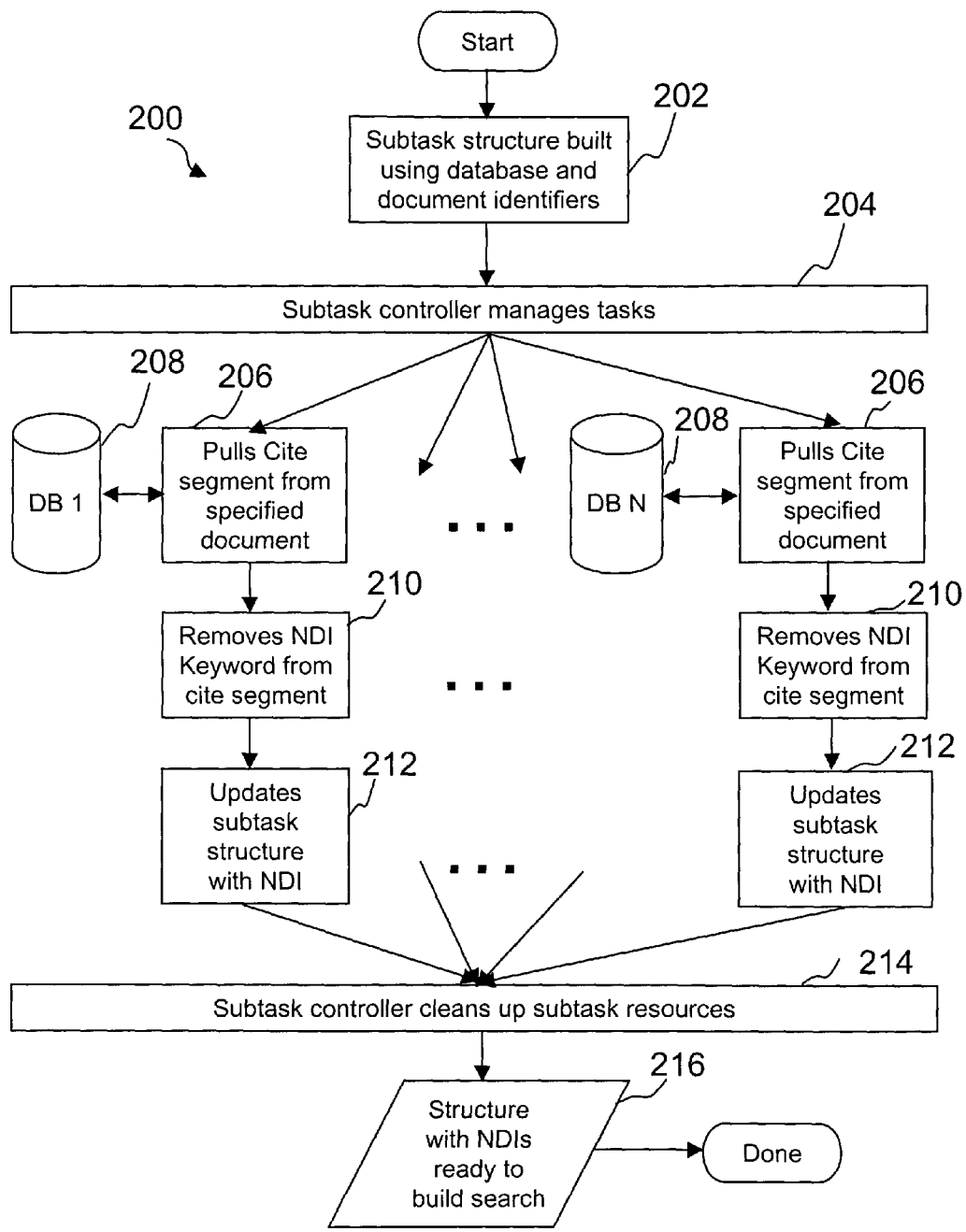
FIG. 12 is a high level flow diagram of the normalized document identifier (NDI) retrieval process.
Figure 13:
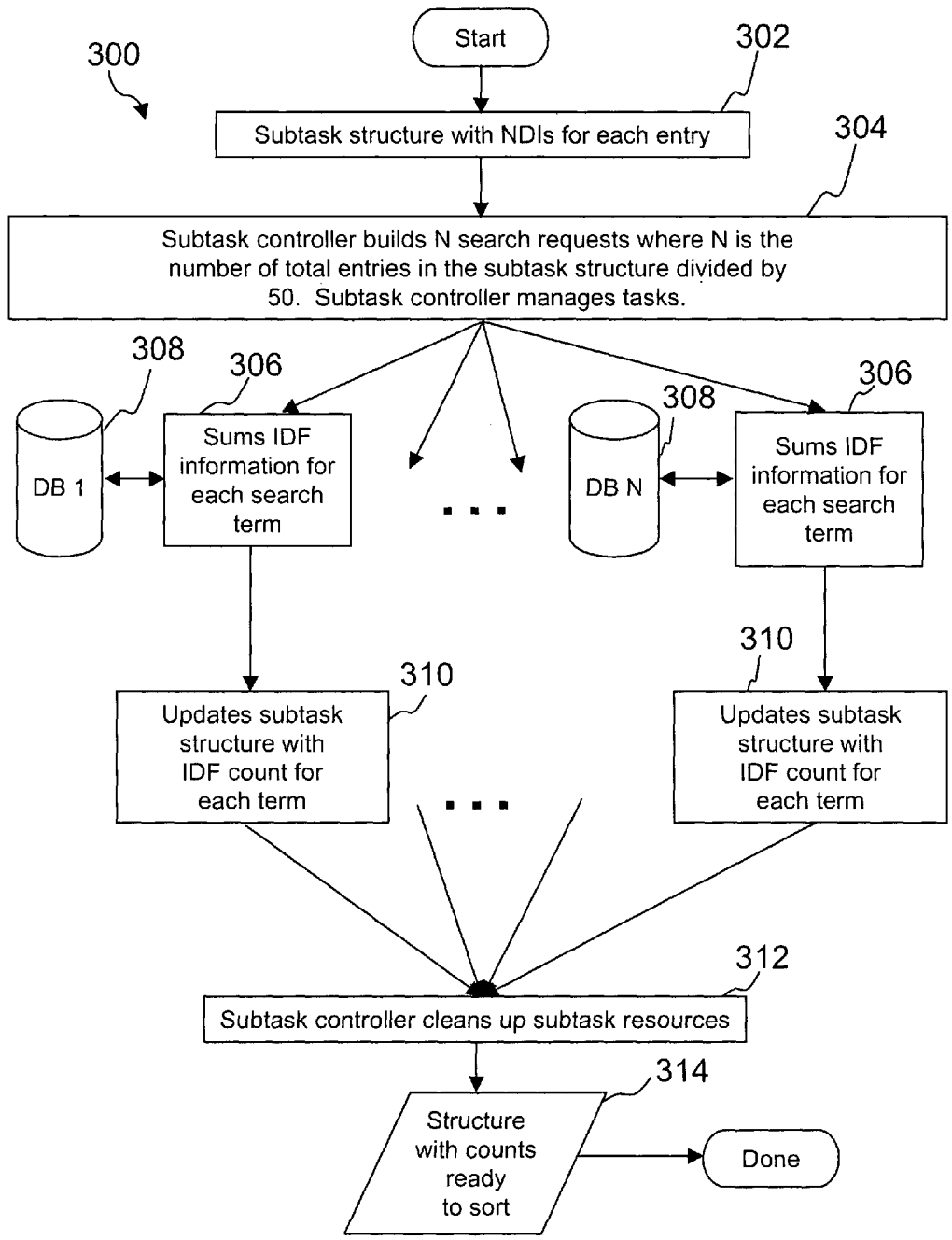
FIG. 13 is a high level flow diagram of the NDI Search process.

Referring now to FIGS. 11-13, there are shown high-level flow diagrams illustrating the steps following in ranking the cases.

FIG. 11 is a high level flow diagram of the Frequently Cited process 100. Blocks 102-110 of FIG. 11 represent the following steps:

102: The process begins with a sort request of an existing search answer set. The answer set is presumed to be a complete collection of documents for a specific topic within a defined jurisdiction and date range.

104: For each document in the set, the normalized document identifier (NDI) of the primary citation for that document (determined by the order established by *The Bluebook: A Uniform System of Citation* (published by the Harvard Law Review Association in conjunction with the Columbia Law Review, the University of Pennsylvania Law Review, and the Yale Law Journal)) is retrieved.

106: A search request is constructed using the retrieved NDIs as search terms. The search is restricted to the current document set.

108: The search engine generates document frequency counts for each term within the search request. The Lexis™ Research System inserts NDI keywords for the official citation reporters into each citing reference within caselaw documents. The search request finds these citing NDI keywords for the NDI terms within the search request. These terms correspond to the documents in the set, and each document frequency is assigned to its corresponding document. The Lexis Freestyle Search Engine identifies relevant documents using search process described in U.S. Pat. No. 5,692,176, which is incorporated herein by reference, however, the search process is aborted immediately after the calculation of the document frequencies.

110: The documents within the set are resorted based upon their assigned frequencies.

In step 104 of the Frequently Cited process 100 as shown in FIG. 11, the NDI is retrieved by pulling it from the cite segment of that document. Alternatively, the NDIs can be harvested and maintained in a specialized database. While this alternative NDI retrieval method would make it easier to get the NDIs for the documents in the answer set, it would create synchronization problems between the NDIs in the two separate databases, which would need to be solved.

FIG. 12 is a high level flow diagram of the NDI process 200. Blocks 202-216 of FIG. 12 represent the following steps:

202: The search answer set contains documents from one or more databases (DB). A subtask structure is defined for each DB.

204: The subtask control component of the pre-search software process creates an independently executing subtask for each subtask structure and starts each subtask so they can complete their assigned work in parallel.

206: The subtask processes each document assigned to it. It first retrieves the data assigned to the cite segment within the document.

208: The cite segment is read from the DB.

210: The NDI is extracted from the cite segment data.

212: The NDI is posted into the subtask structure.

214: The subtask control component terminates each subtask when they complete and frees any resources such as dynamic memory held by the subtask.

216: The NDIs are all available for the search step of the sort process.

FIG. 13 is a high level flow diagram of the NDI Search process 300. Blocks 302-314 of FIG. 13 represent the following steps:

302: The search request contains a search term for each document in the answer set, up to 3000 terms. A subtask structure is created for each 50 search terms.

304: The subtask control component of the pre-search software process creates an independently executing subtask for each subtask structure and starts each subtask so they can complete their assigned work in parallel.

306: Each subtask processes its search request by locating the keywords within the request in the DB dictionary, and counting occurrences of each keyword for the documents being searched.

308: The DB contains a Dictionary of keywords within the documents with location information for each keyword. The location information includes the document numbers.

310: The document frequency for each search term is returned and updated into the subtask structure.

312: The subtask control component terminates each subtask when they complete and frees any resources such as dynamic memory held by the subtask.

314: The document frequencies for each search term are assigned back to the document from with the search term originated, and documents can now be sorted by citation frequency.

Modifications and variations of the above-described embodiments of the present invention are possible, as appreciated by those skilled in the art in light of the above teachings. It is therefore to be understood that the invention may be practiced otherwise than as specifically described.

What is claimed is:

1. A method for identifying landmark documents in a document database, wherein each document in the database has a standardized citation and a normalized document identifier corresponding to the standardized citation, and wherein each document that includes a citation to another document in the database also includes a normalized document identifier keyword for the normalized document identifier of the cited document, the method comprising the steps of:
    (a) retrieving from a database the most relevant documents on a topic selected by a user from a pre-defined topical hierarchy, the retrieved documents defining an answer set;
    (b) following step (a), displaying the answer set to the user, sorted in an order based on bibliographic information;
    (c) following step (b), and in response to a user request to sort the answer set based on frequency of citation, retrieving the normalized document identifiers corresponding to the standardized citations of the retrieved documents;
    (d) constructing a search request using the retrieved normalized document identifiers as search terms, wherein the search request contains a search term for each document in the answer set;
    (e) generating document frequency counts for each search term within the search request for documents in the answer set by counting occurrences of each normalized document identifier keyword corresponding to a search term within the request in the documents in the answer set;
    (f) resorting the documents within the answer set based upon the document frequency counts; and
    (g) following step (f), displaying the resorted answer set to the user.

2. The landmark document identification method of claim 1, wherein step (g) also comprises displaying with the sorted answer set the number of documents in which each document in the sorted answer set is cited.

3. The landmark document identification method of claim 1, wherein the topic is a legal topic, and wherein the documents are legal cases.

4. The landmark document identification method of claim 3, wherein in step (a), the retrieved cases are restricted based on a date range specified by the user.

5. The landmark document identification method of claim 3, wherein in step (b), the cases are sorted in order by court and date.

6. The landmark document identification method of claim 1, wherein the topic selected by the user is one of a plurality of pre-defined topics.

7. A method for identifying landmark documents in a document database, wherein each document in the database has a standardized citation and a normalized document identifier corresponding to the standardized citation, and wherein each document that includes a citation to another document in the database also includes a normalized document identifier keyword for the normalized document identifier of the cited document, the method comprising the steps of:
    (a) initiating a search of a database for the most relevant documents on a topic selected by a user from a pre-defined topical hierarchy;
    (b) following step (a), if no documents are found, displaying a message advising the user to change or expand the scope of the search;
    (c) following step (a), if more than a predetermined number of documents is found,
        (i) interrupting the search and
        (ii) displaying a message advising the user that the search has been interrupted and that the user should narrow the scope of the search;
    (d) following step (a) if the number of documents found is at least one and less than the predetermined number, retrieving the most relevant documents on the topic selected by the user, the retrieved documents defining an answer set;
    (e) following step (d), displaying the answer set to the user, sorted in an order based on bibliographic information;
    (f) following step (e), and in response to a user request to sort the answer set based on frequency of citation, retrieving the normalized document identifiers corresponding to the standardized citations of the retrieved documents;
    (g) constructing a search request using the retrieved normalized document identifiers as search terms, wherein the search request contains a search term for each document in the answer set;
    (h) generating document frequency counts for each search term within the search request for documents in the answer set by counting occurrences of each normalized document identifier keyword corresponding to a search term within the request in the documents in the answer set;
    (i) resorting the documents within the answer set based upon the document frequency counts; and
    (j) following step (i), displaying the resorted answer set to the user.

8. The landmark document identification method of claim 7, wherein step (d) also comprises displaying with the sorted answer set the number of documents in which each document in the sorted answer set is cited.

9. The landmark document identification method of claim 7, wherein the topic is a legal topic, and wherein the documents are legal cases.

10. The landmark document identification method of claim 9, wherein in step (a), the searched cases are restricted based on a date range specified by the user.

11. The landmark document identification method of claim 9, wherein in step (e), the cases are sorted in order by court and date.

12. The landmark document identification method of claim 7, wherein the user selects the topic from a plurality of subjects and the subjects from which the user makes a selection are pre-defined.

13. A system for identifying landmark documents in a document database, implemented using a processor of a programmable data processing apparatus, wherein each document in the database has a standardized citation and a normalized document identifier corresponding to the standardized citation, and wherein each document that includes a citation to another document in the database also includes a normalized document identifier keyword for the normalized document identifier of the cited document, the system comprising:

means executed by the processor for retrieving from a database the most relevant documents on a topic selected by a user from a pre-defined topical hierarchy, the retrieved documents defining an initial answer set sorted in an order based on bibliographic information;

means executed by the processor for retrieving the normalized document identifiers corresponding to the standardized citations of the retrieved documents, in response to a user request to sort the answer set based on frequency of citation;

means executed by the processor for constructing a search request using the retrieved normalized document identifiers as search terms, wherein the search request contains a search term for each document in the answer set;

means executed by the processor for generating document frequency counts for each search term within the search request for documents in the answer set by counting occurrences of each normalized document identifier keyword corresponding to a search term within the request in the documents in the answer set;

means executed by the processor for resorting the documents within the answer set based upon the document frequency counts; and means executed by the processor for displaying the initial answer set to the user and for displaying the resorted answer set to the user.

14. The landmark document identification system of claim 13, further comprising:

means for initiating a search of the database for the most relevant documents on the topic;

means for determining whether the number of most relevant documents on the topic is at least one and less than a predetermined number;

means for interrupting the search if the number of most relevant documents is either zero or greater than or equal to the predetermined number; and means for causing the means for displaying to display an error message to the user allowing the user to expand the scope of the search if the number of most relevant documents is zero or to restrict the scope of the search if the number of most relevant documents is greater than or equal to the predetermined number.

15. The landmark document identification system of claim 13, wherein the means for displaying performs the further function of displaying with the sorted answer set the number of documents in which each document in the sorted answer set is cited.

16. The landmark document identification system of claim 13, wherein the topic is a legal topic, and wherein the documents are legal cases.

17. The landmark document identification system of claim 16, wherein the means for retrieving retrieves cases limited to a jurisdiction specified by the user.

18. The landmark document identification method of claim 17, wherein the means for retrieving retrieves cases restricted to a date range specified by the user.

19. The landmark document identification method of claim 16, wherein the means for displaying displays the cases in the initial answer set sorted in order by court and date.

20. The landmark document identification system of claim 13, wherein the user selects the topic from a plurality of subject and the subjects from which the user makes a selection are pre-defined.

\* \* \* \* \*